J. A. FESLER.
LUBRICATING APPARATUS.
APPLICATION FILED AUG. 25, 1919.
1,341,420.
Patented May 25, 1920.
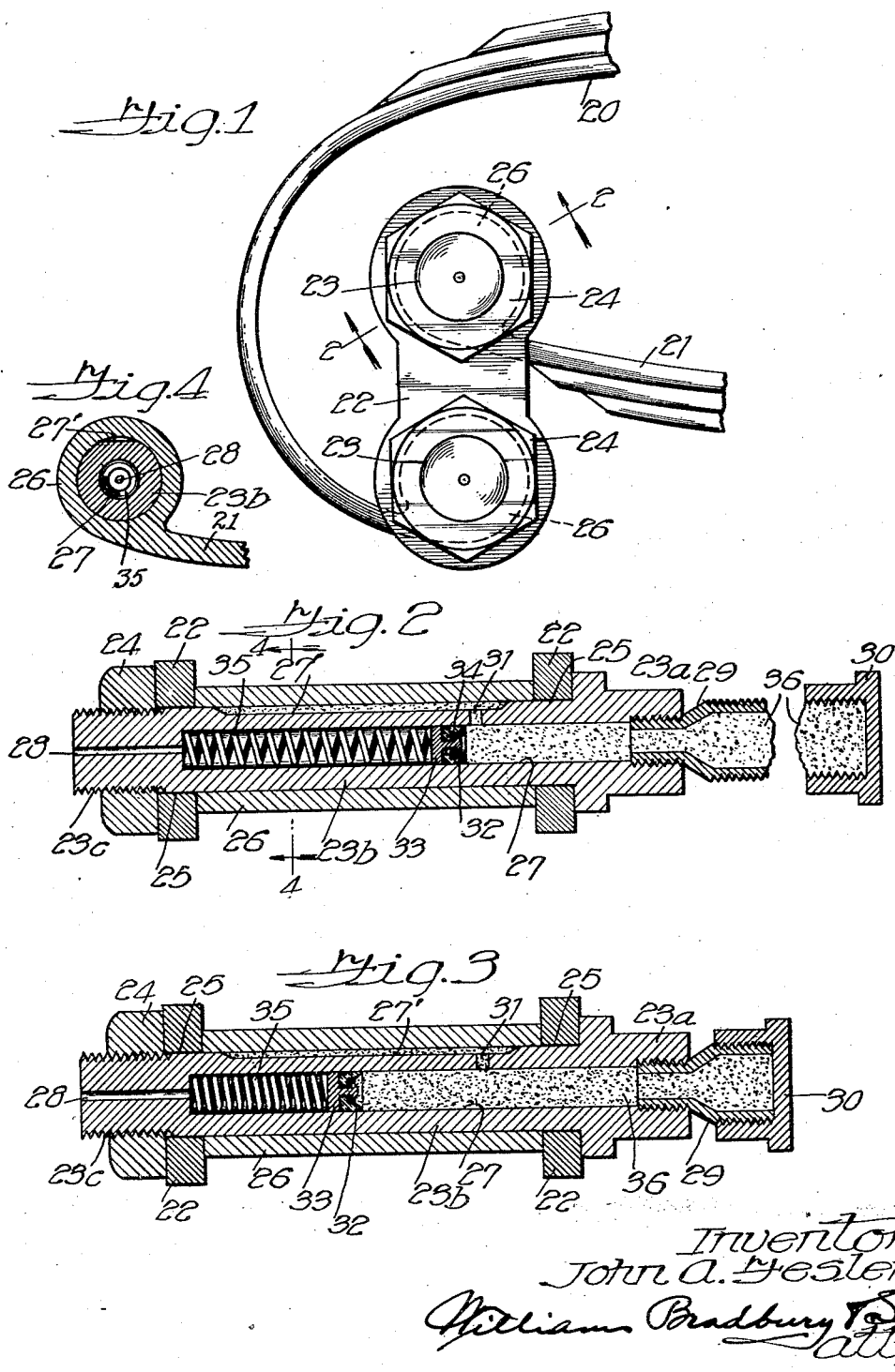

UNITED STATES PATENT OFFICE.

JOHN A. FESLER, OF DETROIT, MICHIGAN.

LUBRICATING APPARATUS.

1,341,420.

Specification of Letters Patent.   Patented May 25, 1920.

Application filed August 25, 1919.   Serial No. 319,673.

*To all whom it may concern:*

Be it known that I, JOHN A. FESLER, a citizen of the United States, residing at Detroit, in the county of Wayne and State of Michigan, have invented a certain new and useful Improvement in Lubricating Apparatus, of which the following is a full, clear, and concise description, reference being had to the accompanying drawings, forming a part of this specification.

My invention relates to lubricating apparatus and is particularly concerned with the provision of means for securing and at all times maintaining a sufficient quantity of grease or other lubricant between the wearing surfaces of shackle bolts, king bolts, etc. and the parts with which they coöperate. While the improvements of my invention are particularly advantageous when utilized in connection with shackle bolts and king bolts, and while in the accompanying drawings I have illustrated my invention as applied to a shackle bolt construction, I appreciate the fact that my invention can be used for the purpose of lubricating practically all types of bearings which consist of a male element in the form of a bolt or other similar part and a female element in the form of a sleeve or partial sleeve.

As a description of my invention will be best understood when read in connection with drawings illustrating the same, I shall proceed at once to a detailed description of one embodiment of my invention. In this detailed description reference is made to the accompanying drawings, wherein—

Figure 1 is a fragmentary elevational view of the upper and lower portions of an automobile spring, which are connected by shackles and shackle bolts constructed in accordance with my invention;

Fig. 2 is a longitudinal sectional view of one of the shackle bolts, this view being taken on the line 2—2 of Fig. 1, looking in the direction indicated by the arrows, and illustrating the movable parts within the shackle bolt in the positions which they assume when there is a comparatively small amount of grease or other lubricant contained within the shackle bolt;

Fig. 3 illustrates the same parts in the positions assumed thereby when a considerable quantity of grease or other lubricant has been forced into and retained in the shackle bolt; and Fig. 4 is a cross sectional view taken on the line 4—4 of Fig. 3.

Similar characters of reference refer to similar parts throughout the several views.

Referring to the drawings, wherein I have illustrated one embodiment of my invention, the reference characters 20 and 21 indicate the ends of the upper and lower portions of an automobile spring which are connected by a pair of shackles 22, 22, with which coöperate the shackle bolts 23, 23, embodying the improvements of my invention.

Externally the form of shackle bolt herein shown is substantially identical with shackle bolts now in general use, the bolt comprising a flanged head 23$^a$ and a cylindrical shank 23$^b$, which at the end thereof opposite the head is provided with external screwthreads 23$^c$ arranged to coöperate with the usual nut 24. The body portion or shank of the shackle bolt in each case extends through registering apertures 25, 25 in the oppositely disposed shackles 22, 22. The bolt shank is preferably fitted tightly in the shackle apertures 25, 25 to insure that when the upper and lower portions of the spring yield there will certainly be relative movement between the bolt shank and the sleeve which lies therearound.

Each of the master leaves of the upper and lower portions of the spring is provided with the usual cylindrical bearing or sleeve portion indicated at 26, which lies between the shackles 22, 22 and snugly fits the shank of the shackle bolt. As is usual, the bolt shank is flattened at 27' to provide a small space or passage between the bolt shank and the inner cylindrical surface of the spring sleeve 26. All portions of the bolt shank except the flattened portion thereof snugly fit the inner cylindrical surface of the sleeve, so that the mechanism presently to be described will not function to supply an excess of grease to the wearing surfaces of the sleeve and bolt when there is no relative movement between the bolt and sleeve.

Extending through the shackle bolt head and shank and terminating at a point near the externally threaded end of the latter is a cylindrical bore 27. A comparatively small bore 28 affords communication between the atmosphere and the inner end of bore 27. The bolt head is conveniently provided with internal threads to receive the threaded end of a grease cup shank 29, which is arranged to coöperate in the usual manner with the grease cup cap 30.

A small radial opening 31 in the bolt shank affords communication between bore 27 and the space between the sleeve and the flattened portion of the bolt shank. Disposed in the bore 27 is a plunger comprising a cup leather 32, which faces toward the bolt head. In addition to the cup leather the said plunger preferably comprises a disk 33 provided with a small central boss, which extends through registering apertures in the cup leather and a small washer 34, and is upset securely to rivet disk, cup leather and washer together. This specific plunger construction is, of course, merely representative and need not necessarily be followed in practice. A helical compression spring 35, which is disposed in bore 27, normally tends to urge the plunger toward that end of the passage 27 into which the grease or other lubricant indicated at 36 is initially forced.

In Fig. 2 the cup leather plunger is shown in the position which it assumes when the supply of grease or other lubricant within the shackle bolt is low. In this figure the grease cup cap is shown filled with grease ready to be applied to the shank 29. When the grease cup cap is screwed upon the shank as shown in Fig. 3, the grease contained in the cap is forced into the grease cup stem and thence into the bore 27, with the result that the cup leather plunger is caused to compress spring 29, as is illustrated in Fig. 3, the small bore 28 permitting the air behind the cup leather plunger to escape as the plunger is moved against the action of the compression spring.

The grease cup cap now prevents the escape of grease from passage 27 through any avenue save the small radial opening 31, despite the fact that the compression spring 35 maintains the lubricant under considerable pressure, which of course is dependent upon the strength of the spring and the point to which it has been compressed by the grease forced into the bore 27, as has been previously explained.

I have found that due to the snug fit between the shackle bolt and the sleeve, an excess quantity of lubricant is not forced from the bore 27 despite the fact that the lubricant is maintained under considerable pressure by the spring 35. In fact, when there is no relative movement between the shackle bolt and the sleeve, there is no flow of lubricant through the small aperture 31. On the other hand, when the sleeve is caused to move relatively to the shackle bolt, the spring 35, acting against the plunger, acts positively to force sufficient lubricant through the aperture 31 adequately to lubricate the coöperating surfaces of the sleeve and shackle bolt and the engaging surfaces of the sleeve and shackles as well.

In my improved shackle bolt the lubricant is maintained under pressure at all times after it is forced into the bore 27 by the grease cup cap or other equivalent means. In ordinary constructions the lubricant is forced into the hollow shackle bolt under pressure, but since the lubricant is practically non-compressible, it is under no pressure after the application of the pressure used to force it into the bolt ceases.

While I have illustrated the improvements of my invention applied to a shackle bolt, it will be understood that the invention is equally applicable to king bolt bearings and other analogous constructions. Furthermore, while I have illustrated an ordinary grease cup shank as a means through which lubricant may be forced into the hollow shackle bolt, and have shown an ordinary grease cup cap for forcing the lubricant into the bolt against the action of the compression spring, and for preventing the compression spring from ejecting the lubricant through the supply opening, any suitable means may be utilized for forcing the lubricant into the shackle bolt and for preventing its escape through the supply opening after the spring has been compressed as herein described.

Having thus described my invention, what I claim as new and desire to secure by Letters Patent of the United States is:

1. A shackle bolt having a longitudinal bore therein extending from one end thereof to a point short of the other end thereof, a second and smaller bore extending from the last mentioned end of the bolt to said larger bore and affording communication between said larger bore and the atmosphere, a plunger in said larger bore, a compression spring tending to move said plunger away from said smaller bore, a radial passage in said bolt extending from the larger bore to the outer surface of the bolt, and means through which lubricant may be forced under pressure into said larger bore to compress said spring, and a device for preventing said spring from ejecting the lubricant through said last mentioned means.

2. A bolt of the class described, having a longitudinal passage therein, a radial opening extending from said passage to the outer surface of the bolt, means through which lubricant under pressure may be forced into said passage, a device for preventing the escape of lubricant through said last mentioned means, a plunger in said passage, a spring in said passage acting against the plunger and tending to move said plunger to force the lubricant out of said passage, whereby said spring is compressed when lubricant is forced into said passage under pressure, and a passage affording communication between the atmosphere and the space behind said plunger.

3. In combination with a bearing comprising a cylindrical male member and a female member in the form of a sleeve fitting around said male member, a longitudinal passage in said male member, a radial opening extending from said passage to the outer surface of the male member, means whereby lubricant may be forced into said passage and its escape prevented through any avenue save the radial opening aforesaid, a plunger in said passage, a compression spring acting against said plunger, tending to oppose the supply of lubricant to said passage, whereby said spring is compressed when the lubricant is forced into said passage under pressure, and means for permitting the escape of air from behind said plunger when said spring is compressed.

4. A bolt of the class described having a longitudinal passage therein, a second passage extending from the longitudinal passage to the outer surface of the bolt, means whereby lubricant under pressure may be forced into said longitudinal passage and its escape therefrom prevented except to the outer surface of the bolt, a piston in said longitudinal passage and compressible resilient means acting against said piston, said resilient means tending to oppose the supply of lubricant to said longitudinal passage.

5. In combination with a bearing comprising a cylindrical male member and a female member in the form of a sleeve fitting around said male member, a longitudinal passage in said male member, a radial passage extending from said longitudinal passage from a point near one end thereof to the outer surface of the male member, means whereby lubricant under pressure may be forced into said longitudinal passage at a point adjacent said radial passage, and its escape prevented through any avenue save the radial passage aforesaid, a cup-leather piston disposed in said longitudinal passage and snugly fitting within the same, a compression spring also disposed in said longitudinal passage and acting against said piston, said spring tending to oppose the supply of lubricant to said longitudinal passage, whereby said spring is compressed when lubricant is forced into said longitudinal passage under pressure, and means for permitting the escape of air from behind the piston when said spring is compressed.

In witness whereof I hereunto subscribe my name this 22nd day of August, 1919.

JOHN A. FESLER.

Witnesses:
STANFORD C. WASTELL,
MARTHA E. SPENCER.